Dec. 8, 1931.  G. M. BELLANCA  1,835,371
AIRPLANE LANDING GEAR
Filed Nov. 27, 1928
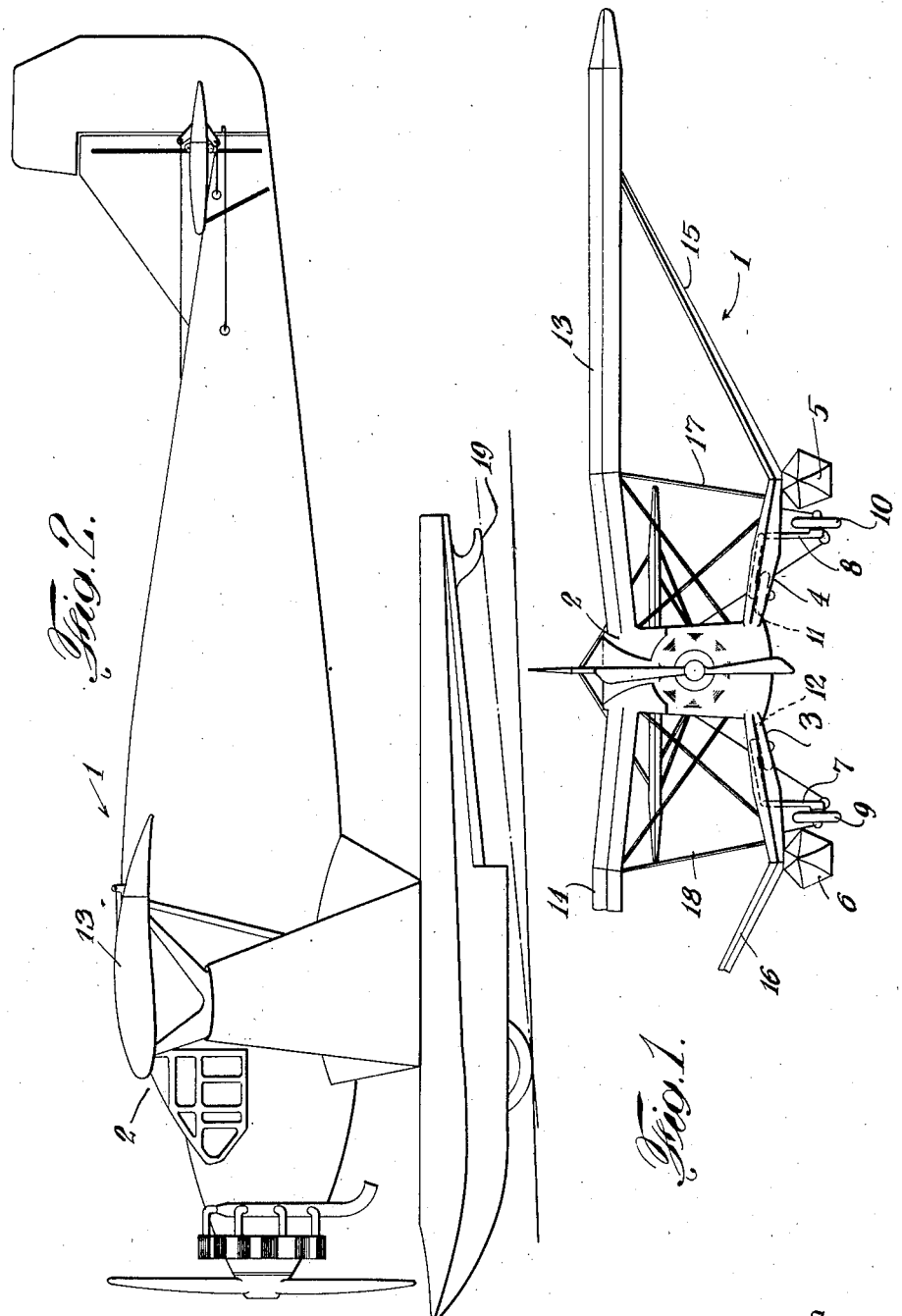

Patented Dec. 8, 1931

1,835,371

UNITED STATES PATENT OFFICE

GUISEPPE M. BELLANCA, OF WILMINGTON, DELAWARE

AIRPLANE LANDING GEAR

Application filed November 27, 1928. Serial No. 322,129.

This invention relates to a landing gear for a combination land and sea plane and will be understood from the following description read in conjunction with the drawings, in which Fig. 1 is a front view of an airplane constructed in accordance with my invention; and Fig. 2 is a side view thereof.

The airplane 1 comprises fuselage 2 to which are secured wings 3 and 4 preferably connected to the fuselage adjacent the lower part thereof. These wings preferably have a cathedral as illustrated, that is, they extend outwardly and downwardly. At corresponding distances from the fuselage and secured to the wings 3 and 4 I place landing pontoons 5 and 6. These may be secured to the wing structure by fittings or in any other suitable manner and are preferably secured to the forward and rearward beams of the wings 3 and 4, respectively. Adjacent the pontoons and also connected directly with the wing structure I install arms 7 and 8 which are pivotally secured to the respective wings. These arms carry landing wheel axles and landing wheels 9 and 10 on said axles. The arms are preferably so connected to the wings that they swing in a direction transverse to the direction of flight. Recesses are provided in the wings to receive the arms and the landing wheels so that these may be fully retracted into the wing structure in the positions indicated in outlines 11 and 12 in Fig. 1. The arms and wheels preferably swing inwardly and upwardly to the retracted positions 11 and 12 and when swung downwardly and outwardly to the landing positions are automatically carried at corresponding distances from the fuselage, thereby giving the effect of a relatively wide wheel base with corresponding ease of landing and stability when rolling. The combination landing structure described may be applied to any plane, particularly when the wings are connected adjacent the lower portions of the fuselage and/or have a cathedral. The preferred embodiment of my inventon is, however, in a plane of the type illustrated in the drawings in which the plane carries upper wings, such as 13 and 14, connected to the fuselage and lower wings relatively shorter than the upper wings, such as 3 and 4 previously described. The wings 3 and 4 may be hereinafter referred to as stub wings and preferably are constructed with a cathedral. The pontoons are preferably attached directly to these wings adjacent their extremities, and the lower supporting arms 7 and 8 are pivotally attached to the said wings adjacent the pontoons so that either landing means, when used, is spaced at a distance from the fuselage. It will, of course, be understood that suitable abutments and locking means will be incorporated to hold the landing gear comprising the wheels in either retracted or operative position, as required. I preferably incorporate strut members 15 and 16 extending outwardly and upwardly from the extremities of the stub wings and connected to the upper wings. These strut members are preferably so formed as to constitute in addition true wing surfaces, that is, about the strut or struts there are placed compression ribs and a true air foil surface so that the strut member has the cross section of a normal wing structure. The members 15 and 16 may be hereinafter referred to as strut-wings. This wing structure preferably tapers and becomes of gradually reduced cross section in passing from the extremity of the stub wing to the point at which it joins the upper wing. Additional strut members may be employed between the wings 13 and 14 and the lower wings 3 and 4, as, for example, 17 and 18. The lower stub wings and strut-wings which extend diagonally upward therefrom constitute a relatively rigid structure in which the extremities of the upper wings outside of the point of attachment of the strut-wings 15 and 16 are preferably of cantilever construction, while that part of the upper wings within the points of attachment constitutes, together with the lower wings and strut-wings beams of exceptional strength and lightness with a maximum of lifting capacity and with the additional ability of carrying landing gears herein described without the use of additional braces, struts, etc.

The strut-wings 15 and 16 hereinabove referred to may each comprise an air foil surface backed by ribs which in turn are secured to the struts which connect the extremities of the lower wings with the corresponding upper wings. I may employ only one strut to extend in this manner from lower to upper wings and utilize this member to carry the ribs mentioned, or I may employ two or more strut members and a common set of ribs surrounding and attached to these strut members to back a single air foil surface. Alternatively, I may employ two or more strut members extending from each lower wing to the corresponding upper wing and make each of these strut members the foundation for a separate and distinct wing portion by surrounding each such strut member with a distinct and separate set of ribs and an air foil surface. Such strut-wings in any event have the cross section of airplane wings and are true wing portions. All such modifications will be hereinafter embraced in the term strut-wing.

When the landing wheels are in operative position for landing they project for a distance below the pontoons. The tail skid is preferably eliminated in this type of plane. Skids, such as 19 and 20, are connected to the pontoons 5 and 6 preferably adjacent their rear ends to hold the plane at a predetermined angle when landing or rolling.

It will, of course, be understood that the foregoing specific description is by way of illustration and not of limitation. It is my intention that the invention be limited only by the appended claims, or their equivalents, in which I have endeavored to claim broadly all inherent novelty.

I claim:

1. Landing gear for airplanes comprising in combination a fuselage, upper wings extending therefrom, relatively short lower wings extending therefrom, strut-wings extending from the outer extremities of said lower wings outwardly and upwardly and joined to the said upper wings, recesses in the under part of said lower wings, arms carrying the said landing wheels pivotally secured to the said lower wings adjacent their outer extremities, means for retracting the said landing wheels into the said recesses by swinging the said arms, and landing pontoons secured directly to the said lower wings adjacent the said arms.

2. Apparatus according to claim 1 in which the said lower wings have a cathedral.

3. Apparatus according to claim 1 in which the said arms and wheels are adapted to swing upwardly and inwardly to the retracted position.

4. Apparatus according to claim 1 comprising in addition landing skids carried by the said landing pontoons adjacent their rear ends.

In testimony whereof, I have signed my name to this specification this 15 day of November, 1928.

GUISEPPE M. BELLANCA.